United States Patent [19]

Yokoyama

[11] Patent Number: 4,490,747
[45] Date of Patent: Dec. 25, 1984

[54] APPARATUS FOR FILING PICTURE INFORMATION

[75] Inventor: Makoto Yokoyama, Atsugi, Japan

[73] Assignee: Tokyo Shibaura Denki Kabushiki Kaisha, Kawasaki, Japan

[21] Appl. No.: 513,956

[22] Filed: Jul. 15, 1983

Related U.S. Application Data

[63] Continuation of Ser. No. 204,911, Nov. 7, 1980, abandoned.

[30] Foreign Application Priority Data

Nov. 16, 1979 [JP] Japan .................. 54-147656

[51] Int. Cl.³ .................. H04N 1/28; H04N 5/78; H04N 5/85
[52] U.S. Cl. .................. 358/296; 358/342; 360/35.1; 360/72.1; 369/14; 369/32
[58] Field of Search .................. 369/14, 32-33, 369/41; 360/32-33, 35, 9-11, 72.1-72.4, 33.1, 35.1; 358/127-132, 903, 296, 342, 335; 235/379, 432, 449, 454

[56] References Cited

U.S. PATENT DOCUMENTS

| | | |
|---|---|---|
| 3,852,571 | 12/1974 | Hall et al. |
| 4,013,876 | 3/1977 | Anstin .................. 358/903 |
| 4,139,869 | 2/1979 | Holt .................. 360/35 |
| 4,205,780 | 6/1980 | Brns et al. .................. 235/432 |
| 4,264,808 | 4/1981 | Owens et al. .................. 360/33 |
| 4,333,160 | 6/1982 | Kobari et al. .................. 358/127 |

OTHER PUBLICATIONS

Mayers et al., IBM Technical Disclosure Bulletin, vol. 16, No. 7, 12/73, pp. 2169-2171.
Bruce et al., IBM Technical Disclosure Bulletin, vol. 22, No. 3, 8/79, p. 1183.

Primary Examiner—Raymond F. Cardillo, Jr.
Attorney, Agent, or Firm—Cushman, Darby & Cushman

[57] ABSTRACT

A main control unit is connected through a selection unit to a magnetic tape memory device and an optical disk memory device. Picture information of a document which is subject to correction or revision is stored together with corresponding index information in the magnetic tape memory device, and picture information which does not require correction or revision is stored together with corresponding index information in the optical disc memory device. Index information for the picture information to be written or read out and also one of the memory devices are specified with a keyboard, which is connected to the main control unit. A reading unit, which is connected to the main control unit, reads out picture information of the document through scanning thereof and supplies the information thus obtained to the main control unit. A recording unit, which is also connected to the main control unit, records picture information supplied from the main control unit on recording sheet.

7 Claims, 6 Drawing Figures

APPARATUS FOR FILING PICTURE INFORMATION

This is a continuation of application Ser. No. 204,911, filed Nov. 7, 1980, now abandoned.

BACKGROUND OF THE INVENTION

This invention relates to an apparatus for filing picture information which has a plurality of memory units for memorizing picture information and, more particularly, to an apparatus for filing picture information, which is free from the possibility of erroneously destroying memorized picture information.

Recently, a document filing apparatus has been developed as an energy-saving apparatus for handling a great number of documents. With such a document filing apparatus, picture information is read out by optically scanning the document. The picture information thus obtained is then filed in a memory together with a corresponding index code. The picture information thus filed can be read out, when desired, by searching for the corresponding index code. The read-out picture information can be recorded on a recording sheet (hard copy) in a recording unit.

Magnetic tape memory devices and optical disc memory devices are used as the memory for this document filing apparatus. In the case of magnetic tape memory, picture information is stored on a magnetic tape via a magnetic head. The picture information is obtained by optically scanning the surface of a document to be filed using a laser beam and photoelectrically converting the information thus read out.

In the case of an optical disc memory, picture information obtained by the aforementioned optical scanning process is stored on a disc by rotating the disc at a constant speed, projecting a laser beam onto the disc in accordance with the picture information, and then evaporating a metal layer on the disc surface to form a track-like arrangement of pits (oval holes). The disc consists of a glass disc on which the metal layer is formed.

The magnetic tape memory, which magnetically memorizes picture information, has an advantage in that rewriting of memorized picture information, for instance, for correction or revision, can be readily performed. However, a major disadvantage of this memory is that memorized picture information can be easily lost or changed by erroneous operation, which is undesirable from the standpoint of preserving information.

The optical disc memory, with which picture information is stored by the formation of pits, is superior in terms of reliably preserving picture information. However, with this memory it is impossible to perform rewriting, for instance correction or revision, of picture information once it has been memorized.

SUMMARY OF THE INVENTION

An object of the Invention is to provide a picture information filing apparatus, with which stored picture information that is not considered subject to possible correction or revision will never be changed by erroneous operation.

Another object of the invention is to provide a picture information filing apparatus, with which memories can be effectively utilized.

To achieve these objects, the apparatus according to the invention comprises an input means for optically scanning pictures to be filed and converting them to electric signals; a main control unit connected to the input means for receiving and temporarily storing the picture information produced and also producing various control signals with predetermined timings; an input/output unit connected to the main control unit for specifying index information to be attached to or already attached to picture information, a memory unit to be used and an operation mode; a selection unit connected to the main control unit for selecting a memory unit to be used; and a plurality of memory units connected to the main control unit and selection unit for memorizing picture information from the main control unit through the selection unit and also supplying the memorized picture information to the main control unit through the selection unit, at least one of these memory units being incapable of rewriting.

Thus, with the apparatus according to the invention, picture information that is not subject to possible rewriting can be stored in the second memory which is incapable of rewriting, so that the stored information will never be destroyed by erroneous operation but will be reliably preserved.

Also, with the apparatus according to the invention, picture information that is subject to rewriting can be first stored in the first memory unit capable of rewriting, and then picture information which is subsequently found to require no correction or revision can be stored fresh in the second memory unit incapable of rewriting, thus permitting efficient use of the first memory unit since new picture information can be memorized therein after the transfer of the picture information requiring no correction or revision.

BRIEF DESCRIPTION OF THE DRAWING

The above and other objects and advantages of the invention will become more apparent during the following discussion of the accompanying drawings, in which.

DETAILED DESCRIPTION OF THE PREFERRED EMBODIMENT

Figure 1:
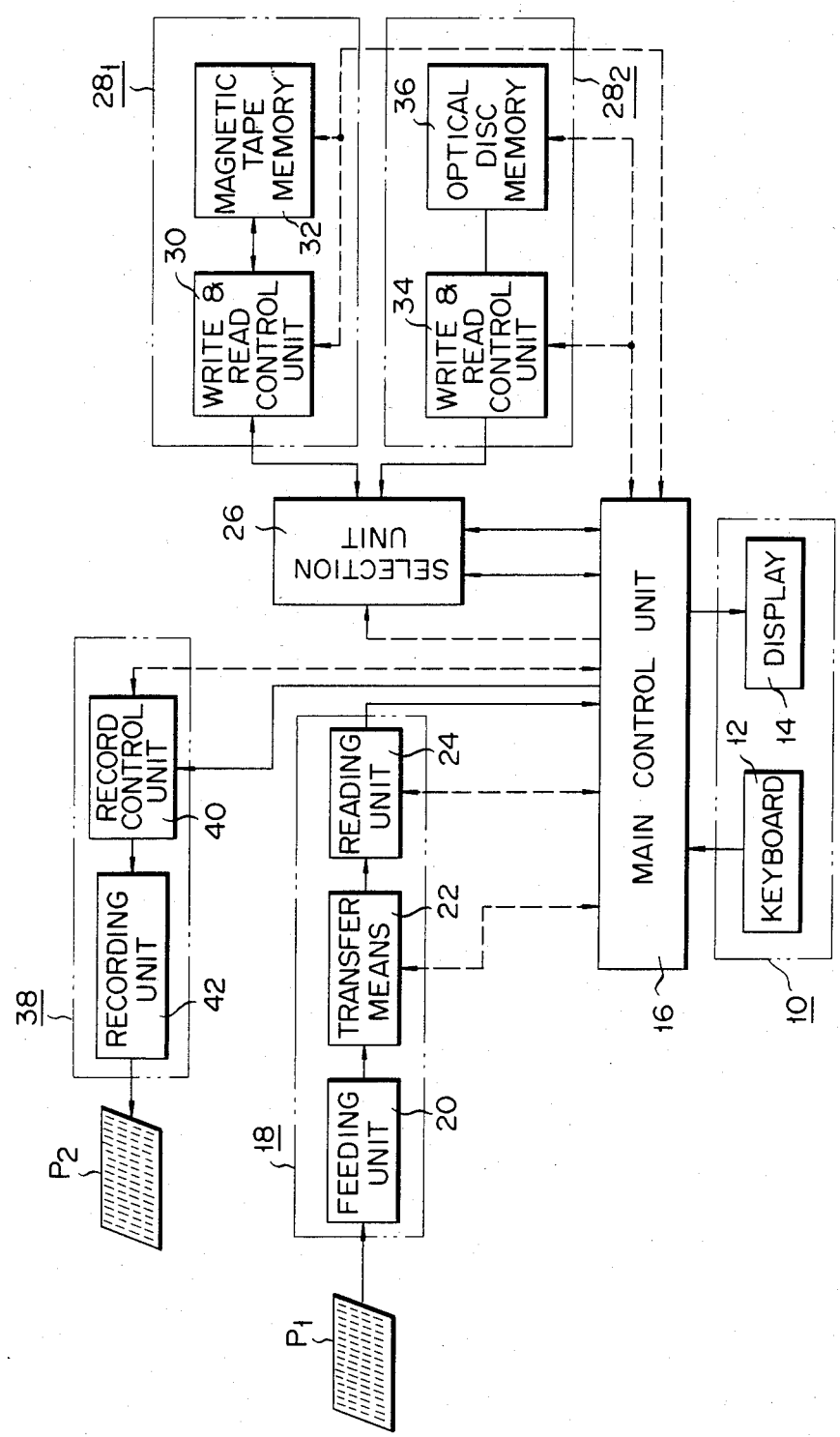
FIG. 1 is a schematic representation of a picture information filing apparatus according to the invention.

FIG. 1 schematically shows the whole construction of a picture information filing apparatus according to the invention. In FIG. 1, solid lines indicate the flow of data handled and dashed lines indicate the flow of control signals. An input/output unit 10 includes a manually operable keyboard 12 and a display unit (CRT display) 14 for displaying an operation guide, etc. In the keyboard 12, index information to be attached or already attached to picture information, a memory unit to be used and an operation mode are specified, and also desired data are displayed in the display unit 14. A main control unit 16 is connected to the input-output unit 10, and it supplies control signals to various component units to be described hereinafter according to signals produced from the input/output unit 10 and also temporarily stores picture information. An input means 18 is connected to the main control unit 16, and it produces picture information of the document $P_1$ as an electric signal from the optical scanning of the document and supplies the picture information thus obtained to the main control unit 16 according to control signals produced therefrom. More particularly, in the input means 18 the aforementioned document $P_1$ which is to be filed is supplied to a feeding unit 20 and is transferred therefrom through a transfer means 22 to a reading unit 24. In the reading unit 24, the document $P_1$ is optically scanned, and the information thus read out is converted into an electric signal. This electric signal is supplied as the picture information of the document $P_1$. A selection unit 26 is connected to the main control unit 16, and it selects one of a plurality of memory units to be described later and transmits stored data to the selected memory unit according to control signals from the main control unit 16. A first memory unit $28_1$ is connected to the main control unit 16 and selection unit 26. Memorized data in the main control unit 16 is transmitted through the selection unit 26 to the first memory unit $28_1$ and memorized therin according to a control signal from the unit 16. Memorized data in the first memory unit $28_1$ is read out therefrom and transmitted through the selection unit 26 to the main control section 16 according to a control signal from the unit 16. In the first memory unit $28_1$, at the time of writing the picture information to be stored and index information attached thereto are temporarily stored in a write and read control unit 30, where the picture information and index information are combined and then transmitted to a magnetic tape memory device 32 and written therein. At the time of reading, picture information which corresponds to given index information supplied to the write and read control unit 30 in the first memory unit $28_1$ is located according to that index information is read out to the write and read control unit 30, and it is transmitted therefrom through the selection unit 26 to the main control unit 16.

A second memory unit $28_2$ is connected to the main control unit 16 and selection unit 26, and has substantially the same function as the first memory unit $28_1$ except that it is incapable of rewriting data once stored. In this memory unit $28_2$, at the time of writing, the picture information and index information supplied from the main control unit 16 is transmitted through the selection unit 26 to a write and read control unit 34, and these data are combined (as index information plus picture information), and transmitted to an optical disc memory device 36 and optically written therein. At the time of reading, picture information corresponding to given index information supplied to the write and read control unit 34 of the second memory unit $28_2$ is optically read out according to that index information and transmitted to the write and read unit 34, and is then transmitted therefrom through the selection unit 26 to the main control unit 16.

An output means 38 is connected to the main control unit 16, and it receives control signal and picture information supplied from the main control unit 16 and records the received picture information on a sheet $P_2$ (hard copy). In the output means 38, picture information supplied from the main control unit 16 is transmitted to a record control unit 40, and a recording unit 42 is controlled according to this picture information to produce hard copy on the sheet $P_2$.

Figure 2:
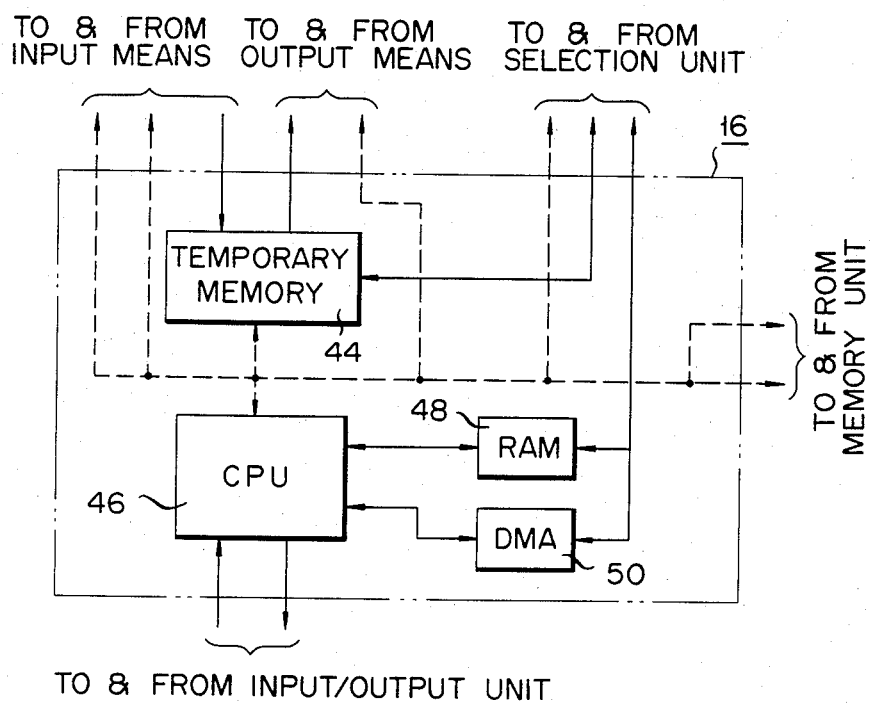
FIG. 2 is a block diagram showing the main control unit shown in FIG. 1.

FIG. 2 shows a block diagram of the main control unit 16 shown in FIG. 1. In FIG. 2, a temporary memory unit (for instance, a page buffer) 44 is connected to the input means 18, output means 38 and selection unit 26. Picture information supplied from the input means 18 is temporarily stored in the page buffer memory 44, and is supplied therefrom to the selection unit 26 according to a control signal supplied from a central processing unit (CPU) 46 to be described in detail later. Also, picture information supplied from the selection unit 26 is temporarily stored in the page buffer memory unit 44, and is supplied therefrom to the output means 38 according to a control signal supplied from the CPU 46. A random access memory (RAM) 48 is connected to the selection unit 26, and it is capable of supplying index information to the selection unit 26 and also store picture information supplied from the selection unit 26. A direct memory access (DMA) 50 is connected to the RAM 48 and selection unit 26, and it serves to transfer picture information at high speed from the selection unit 26 to the RAM 48 directly, i.e., without the agency of the CPU 46. The CPU 46 is connected to the page buffer memory 44, RAM 48 and DMA 50 for supplying control signals to these circuits, and it also supplies and receives data to and from the RAM 48 and DMA 50.

Figure 3:
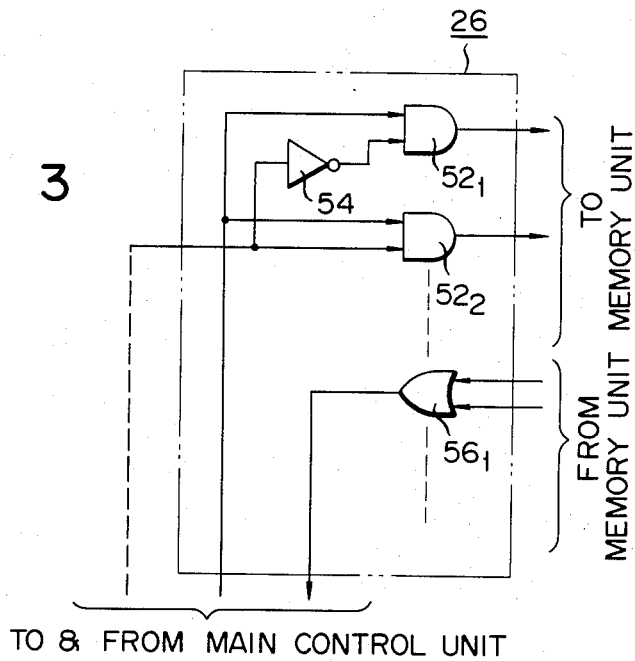
FIG. 3 is a partial circuit diagram showing the selection unit shown in FIG. 1.

FIG. 3 shows a circuit diagram of the selection unit 26 shown in FIG. 1. In FIG. 3 an AND gate $52_1$ has two input terminals, one of which is connected to the main control unit 16 for receiving picture information therefrom. The other input terminal is connected through an inverter 54 to the main control unit 16, and the output of the inverter 54, inverting a control signal from the main control unit 16, is supplied as a gating signal to the AND gate $52_1$ for transferring the picture information therefrom. Another AND gate $52_2$ is the same as the AND gate $52_1$ except that a control signal from the main control unit 16 is supplied directly, i.e., without inversion, as a gating signal. The AND gates $52_1$ and $52_2$ are provided as a pair for one bit of picture information, with a control signal coupled directly to one of them and after inversion to the other. In other words, such AND gate pairs are provided in a number corresponding to the required number of bits for the transfer of picture information. FIG. 3 also shows an OR gate $56_1$ having two input terminals, which are connected to the respective first and second memory units $28_1$ and $28_2$. Thus, the OR gate 56 transfers picture information from the memory unit $28_1$ or $28_2$ as its OR output. Such OR gates are also provided in number corresponding to the number of bits required for transfer of picture information.

Figure 4:
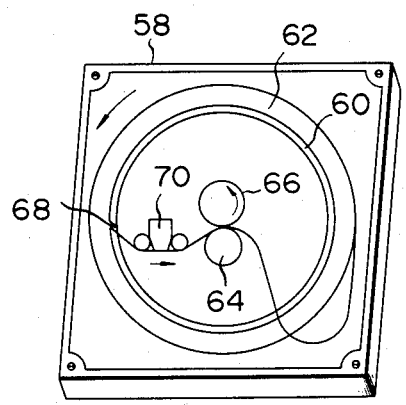
FIG. 4 is a pictorial perspective view showing a cassette tape and co-operating mechanism used in the magnetic tape memory unit shown in FIG. 1.

FIG. 4 schematically shows a cassette tape used in the magnetic tape memory device 32 and also a mechanism co-operating with the tape. A cassette 58 accommodates a stationary reel 60, on which an endless magnetic tape 62 having a width of ½ inch (12.7 mm) and a length of 36 m are wound. The magnetic tape 62 wound on the stationary reel 60 in contact therewith is pulled out therefrom by a pinch roller 64 and a capstan 66 to be let out through an opening formed in the reel 60. The tape thus led out is moved in contact with a magnetic head 70 and wound as the outermost turn of a tape roll on the stationary reel 60. The speed of the magnetic tape 62, moving in the direction of the arrow is as high as 5 m/sec., and one excursion of the tape is completed in 7.2 seconds.

Figure 5:
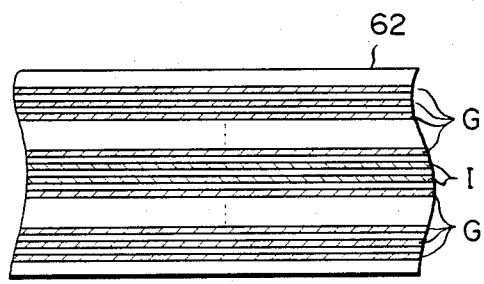
FIG. 5 is a view showing information recording tracks of the magnetic tape shown in FIG. 4.

FIG. 5 shows information recording tracks of the magnetic tape 62 shown in FIG. 4. As is shown, the tape has a plurality of parallel information recording tracks extending in the direction of its movement. Two centrally located tracks in this tape 62 are used as index information recording tracks I, and the tracks on the opposite sides of the tracks I are used as picture information recording tracks G.

Figure 6:
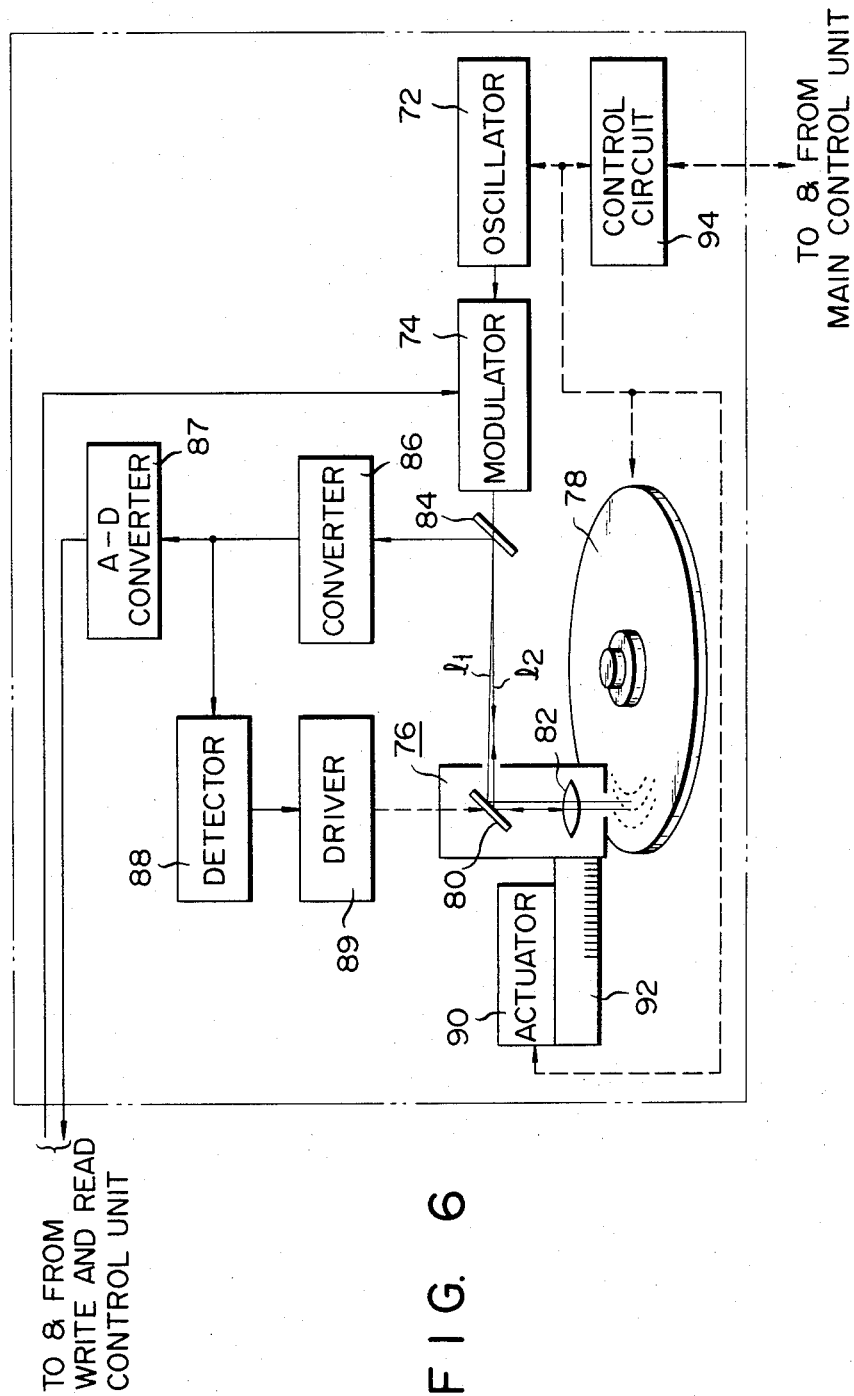
FIG. 6 is a schematic representation of the optical disc memory unit shown in FIG. 1.

FIG. 6 schematically shows the optical disc memory device 36 shown in FIG. 1. This construction of the optical disc memory device is disclosed in, for instance, Japanese Patent Application No. 26310/1979. In FIG. 6, a laser oscillator 72 produces a laser beam, which is modulated by a modulator 74. The modulator 74 is connected to the write and read control unit 34 and on-off modulates the incident laser beam according to a signal output (i.e., picture information and index information) from the write and read control unit 34. An optical head 76 receives the on-off modulated laser beam and projects it onto an optical disc 78 rotating at a constant speed. The optical head 76 includes a galvanometer 80 which is a mirror rockable with respect to the radial direction of the disc 78 and a lens system for focusing the laser beam from the galvanometer 80 onto the disc 78.

The optical disc 78 is formed, for instance, by depositing a metal layer on a glass disc. The metal layer is fused according to the modulation content of the incident light beam $l_1$, whereby a corresponding train of pits is formed. In this way, picture information is recorded in the form of a spiral track on the optical disc 78.

When reading out the record of picture information obtained on the optical disc 78 in the above way, the optical disc 78 is rotated at a constant speed, and a laser beam $l_2$ produced from the laser oscillator 72 is focused through the optical head 76 on the record track on the rotating optical disc 78. With the rotation of the disc 78, the scanning for reading is effected, and reproduction of picture information recorded as a corresponding arrangement of bits on the optical head 76 is obtained as light reflected by the disc 78. The reflected light is transmitted through the optical head 76 and reflected by a reflector 84 to be incident on a photoelectric converter 86, which photoelectrically converts the incident light. An analog-to-digital (A-D) converter 87 is connected to the photoelectric converter 86, and converts the analog signal output of the photoelectric converter 86 into a digital signal suitable for coupling to the write and read control unit 34. A detector 88 is connected to the photoelectric converter 86 and produces a control signal by detecting, from the signal produced from the converter 86, the deviation of the laser beam $l_2$ which is projected on the optical disc 78, from the center of the bit train of the record track. A galvanometer driver 89 is connected to the detector 88 and controls the driving of the galvanometer 80 according to a control signal from the detector 88. A linear actuator 90 is provided with an optical scale 92 for detecting the radial position of the optical head 76 relative to the optical disc 78. The optical scale 92 produces a position signal every time the optical head 76 is shifted in position. This position signal is supplied to a control circuit 94 to cause the circuit 94 to produce a control signal supplied to the linear actuator 90, whereby the position of the linear actuator 90 in the radial direction of the optical disc 78 is controlled.

The control circuit 94 is connected to the main control unit 16, laser oscillator 72, linear actuator 90 and a drive unit (not shown) for driving the optical disc 78, and supplies control signals to these component units.

The operation of the above construction of the embodiment of the invention will now be described. When filing document $P_1$, the document $P_1$ is set in the feeding unit 20 with its picture information side down, and a reading mode is set with the keyboard 12. As a result, a signal is supplied from the keyboard 12 to the main control unit 16, causing the unit 16 to supply a control signal to the transfer means 22. Thus, the transfer means 22 is rendered operative to transfer the document $P_1$ set in the feeding unit 20 to the reading unit 24. When the document $P_1$ is transferred to the reading unit 24, the picture information side of the document $P_1$ is progressively scanned by a laser beam, and the picture information thus read out is converted into an electric signal. The picture information thus obtained as an electric signal through the photoelectric conversion is temporarily stored as unit information in the temporary memory section 44. Subsequently, index information for the picture information thus read out and stored is set with the keyboard 12, and also instructions are given for the operation of writing in the first memory unit $28_1$. As a result, a selection signal is supplied from the main control unit 16 to the selection unit 26, causing the unit 26 to select the first memory unit $28_1$, and, the picture information stored in the temporary memory unit 44 and the index information provided for this picture information are transmitted through the selection unit 26 to the write and read control section 30 and converted therein into a signal for magnetic recording. In this way, the information is written in the magnetic tape memory device 32. At this time, the picture information is recorded in a predetermined picture information recording track G of the cassette tape shown in FIG. 5, while data about the track number of the track G in which the picture information is recorded is recorded together with the index information in an index information recording track. That is, the picture information of the document $P_1$ is memorized together with the index information attached thereto, on the magnetic tape 62.

When picture information stored in the magnetic tape memory device 32 requires no correction or revision, it is stored in the optical disc memory unit 36 together with corresponding index information. In this case operation of transferring stored picture information from the first memory unit $28_1$ to the second $28_2$ is instructed with the keyboard 12. As a result, a signal is supplied from the main control unit 16 to the selection unit 26, causing the unit 26 to select the second memory unit $28_2$, and the specified picture information stored in the magnetic tape memory device 32 is read out to the write and read control unit 30 and is then transmitted therefrom through the selection unit 26 to the temporary memory unit 44 and stored therein. Then, the picture information as well as the corresponding index information stored in the temporary memory unit 44 is transmitted through the selection unit 26 to the write and read control unit 34 and converted therein into a signal suited for on-off controlling of the laser beam by the modulating circuit 74. The modulating circuit 74 is caused to on-off control the laser beam produced from the laser oscillator 72 according to the picture information and index information transmitted as a control signal from the write and read control unit 34. In this way, the information from the write and read control unit 34 is written on the optical disc 78.

In the above explanation, the picture information of the document to be filed is first written in the magnetic tape memory device 32 and is then transferred to the optical disc memory device 36. However, by operating the keyboard 12 it is possible to instruct the operation of writing picture information of the document to be filed directly into the optical disc memory device 36 without first storing it in the magnetic tape memory device 32. More particularly, in this case after the picture information is read out and stored as unit information in the temporary memory unit 44, by operating the keyboard 12 the operation of writing in the second memory unit $28_2$ is specified as well as the setting of index information for the stored picture information. As a result, the second memory unit $28_2$ is selected by the selection unit 26, so that the picture information stored in the temporary memory unit 44 and the index information are transmitted through the selection unit 26 to the write and read control unit 34. The control unit 34 then supplies a control signal to the modulating circuit 74, and the modulating circuit 74 is caused to on-off control the laser beam produced from the laser oscillator 72 according to this control signal.

When obtaining a desired unit of picture information among various units of picture information stored in the magnetic tape memory device 32 or the optical disc memory device 36, by means of the keyboard 12 the operation of reading from either memory device 32 or 36 is specified as well as the index information corresponding to the desired picture information. As a result, control signals are supplied from the main control unit 16 to the selected memory device (either magnetic tape memory device 32 or optical disc memory device 36) and the associated write and read control unit (30 or 34), and the picture information corresponding to the specified index information is read out to the write and read control unit and then transmitted through the selection unit 26 to the temporary memory unit 44 to be stored therein. The picture information stored in the temporary memory unit 44 is then supplied to the recording control unit 40 to cause the unit 40 to control the recording unit 42 accordingly, so that it is recorded on recording sheet $P_2$ in the recording unit 42.

The above embodiment of the invention is by no means limitative. For example, while the above embodiment is provided with one magnetic tape memory device and one optical disc memory device, it is possible to provide a plurality of magnetic tape memory devices or optical disc memory devices. In this way, it is possible to increase the invention's capacity for filing document storage. Further, various changes and modifications can be made without departing from the scope and spirit of the invention.

What is claimed is:

1. A document filing apparatus for filing system picture information comprising:
   input means for scanning an original document to produce picture information corresponding to a pattern of said document;
   main control means, connected to said input means, for receiving from said input means and temporarily storing said picture information;
   rewritable memory means, having a previously non-written memory area and a previously written area into which can be written data including at least index information corresponding to the picture information;
   unrewritable memory means, having a previously non-written area into which data can be written;
   input/output means, connected to said main control means, for (a) specifying said rewritable memory means to change data previously written into said previously written memory area to update data or to write data into said previously non-written memory area and (b) specifying said unrewritable memory means to write in data that is to be permanently written therein, and (c) specifying index information corresponding to the picture information from said input means in a writing operation and index information corresponding to the picture information already stored into said memory means in a reading operation; and
   selecting means, coupled to said main control means and said rewritable and unrewritable memory means, for (a) selecting one or both of said rewritable and unrewritable memory means as specified by said input/output means, (b) supplying data from said main control means to said selected one or both of said memory means during the writing operation and (c) transferring picture information from the selected memory means into which it was previously stored to said main control means during the reading operation.

2. An apparatus for filing picture information according to claim 1, wherein said main clock means includes a temporary memory unit connected to said input means for temporarily storing picture information transmitted from said input means; a central processing unit connected to said temporary memory unit for producing various control signals with predetermined timings; a random access memory connected to said central processing unit and said selecting means for storing a program required for the operation of said central processing unit and supplying and receiving data to and from said selecting means; and a direct memory access controller for transmitting to said random access memory the picture information from said selecting means directly and at a high speed without agency of said central processing means.

3. An apparatus for filing picture information according to claim 1, wherein said selecting means includes a plurality of inverters each having an input terminal connected to said main control means for inverting a control signal therefrom; a plurality of AND gate pairs each consisting of first and second AND gates, said first AND gate having an input terminal connected to the output terminal of a corresponding one of said inverters and another input terminal connected to said main control means and being opened by an inverted control signal, said second AND gate having input terminals connected to said main control means and being opened by a control signal therefrom, said AND gates passing the picture information signal when they are opened; and a plurality of OR gates connected to said first and second memory means for supplying the picture information from said selected memory means to said main control means.

4. An apparatus for filing picture information according to claim 1, wherein said rewritable memory means includes a first write and read control unit connected to said selecting means for receiving and temporarily storing a combination of the picture information and assigned index information transmitted through said selecting means and producing write and read control signals to write and read said combination data; and a magnetic tape memory unit connected to said first write and read control unit and said main control means for magnetically storing said combination data.

5. An apparatus for filing picture information according to claim 1, wherein said unrewritable memory means includes a second write and read control unit connected to said selecting means for receiving and temporarily storing a combination of the picture information and assigned index information transmitted through said selecting means and producing write and read control signals to write and read said combination data; and an optical disc memory unit connected to said second write and read control unit and said main control means for optically storing said combination data.

6. An apparatus for filing picture information according to claim 1, wherein said input/output means comprises a keyboard connected to said main control means for manual operation to specify index information to be attached to or already attached to picture information, and a display section connected to said main control means for displaying desired data.

7. An apparatus for filing picture information according to claim 1, wherein said input means includes a feeding unit for supplying matter carrying picture information to be filed; a transfer unit for transferring said matter supplied from said feeding unit; and a reading unit connected to said main control means for reading said picture information of said matter through optical scanning to produce an electric signal and supplying said electric signal to said main control means.

* * * * *